United States Patent
Dukhovny et al.

(10) Patent No.: US 11,064,046 B2
(45) Date of Patent: *Jul. 13, 2021

(54) DISTRIBUTED QUEUEING IN A REMOTE NETWORK MANAGEMENT ARCHITECTURE

(71) Applicant: ServiceNow, Inc., Santa Clara, CA (US)

(72) Inventors: Vadim Dukhovny, Petah-Tikva (IL); Dov Miron, Petah-Tikva (IL); Marina Osherov, Petah-Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,439

(22) Filed: Jun. 15, 2020

(65) Prior Publication Data
US 2020/0314213 A1 Oct. 1, 2020

Related U.S. Application Data

(63) Continuation of application No. 15/887,098, filed on Feb. 2, 2018, now Pat. No. 10,686,910.

(51) Int. Cl.
*G06F 15/173* (2006.01)
*H04L 29/08* (2006.01)
*H04L 12/24* (2006.01)

(52) U.S. Cl.
CPC ........ *H04L 67/327* (2013.01); *H04L 41/0213* (2013.01); *H04L 41/0253* (2013.01);
(Continued)

(58) Field of Classification Search
USPC ......................................... 709/223, 231, 202
See application file for complete search history.

(56) References Cited

U.S. PATENT DOCUMENTS 6,321,229 B1 11/2001 Goldman
7,020,706 B2 3/2006 Cates
(Continued)

OTHER PUBLICATIONS

ServiceNow Documentation, Service Mapping, Nov. 9, 2017 (downloaded from public web site https://docs.servicenow.com).
(Continued)

*Primary Examiner* — Lan Dai T Truong
(74) *Attorney, Agent, or Firm* — Fletcher Yoder PC

(57) ABSTRACT

An embodiment may involve a computational instance disposed within a remote network management platform. The computational instance may contain queues and facilitate the execution of applications. Communication between the computational instance and a managed network may involve: (i) selecting, by a particular application, a particular output queue; (ii) writing, by the particular application, a unit of work generated by the particular application to the particular output queue; (iii) providing, by particular output queue, the unit of work to a particular proxy server application; (iv) retrieving, by a particular input queue, a result from the particular proxy server application, where the result represents an outcome of the particular proxy server application carrying out the unit of work, and where the particular input queue is associated with the particular output queue; and (v) retrieving, by the particular application, the result from the particular input queue.

20 Claims, 15 Drawing Sheets

(52) U.S. Cl.
CPC .......... *H04L 41/0273* (2013.01); *H04L 41/22* (2013.01); *H04L 41/5096* (2013.01); *H04L 67/2804* (2013.01); *H04L 67/289* (2013.01)

(56) References Cited

U.S. PATENT DOCUMENTS

| | | | |
|---|---|---|---|
| 7,716,353 | B2 | 5/2010 | Golovinsky |
| 7,769,718 | B2 | 8/2010 | Murley |
| 7,925,981 | B2 | 4/2011 | Pourheidari |
| 8,151,261 | B2 | 4/2012 | Sirota |
| 8,402,127 | B2 | 3/2013 | Solin |
| 8,612,408 | B2 | 12/2013 | Trinon |
| 8,646,093 | B2 | 2/2014 | Myers |
| 8,832,652 | B2 | 9/2014 | Mueller |
| 9,065,783 | B2 | 6/2015 | Ding |
| 9,098,322 | B2 | 8/2015 | Apte |
| 9,122,552 | B2 | 9/2015 | Whitney |
| 9,317,327 | B2 | 4/2016 | Apte |
| 9,363,252 | B2 | 6/2016 | Mueller |
| 9,535,737 | B2 | 1/2017 | Joy |
| 9,645,833 | B2 | 5/2017 | Mueller |
| 9,654,573 | B2 | 5/2017 | Miller |
| 9,766,935 | B2 | 9/2017 | Kelkar |
| 9,805,322 | B2 | 10/2017 | Kelkar |
| 2006/0088058 | A1 | 4/2006 | Eckert et al. |
| 2009/0138516 | A1 | 5/2009 | Young et al. |
| 2010/0220589 | A1 | 9/2010 | Zheng et al. |
| 2013/0132612 | A1 | 5/2013 | Chiu et al. |
| 2014/0003396 | A1 | 1/2014 | Yu |
| 2015/0381710 | A1 | 12/2015 | Kish |
| 2016/0140841 | A1 | 5/2016 | Barnes et al. |
| 2016/0191672 | A1 | 6/2016 | Perlman |
| 2017/0093976 | A1 | 3/2017 | Raghunath et al. |

OTHER PUBLICATIONS

ServiceNow Documentations, The ECC queue for Discovery, Nov. 20, 2017 (downloaded from public web site https://docs.servicenow.com).

ServiceNow Documentations, The MID Server ECC Queue, Nov. 20, 2017 (downloaded from public web site https://docs.servicenow.com).

DISTRIBUTED QUEUEING IN A REMOTE NETWORK MANAGEMENT ARCHITECTURE

CROSS-REFERENCE TO RELATED APPLICATION

This application is a continuation of U.S. non-Provisional application Ser. No. 15/887,098, entitled "DISTRIBUTED QUEUEING IN A REMOTE NETWORK MANAGEMENT ARCHITECTURE," filed Feb. 2, 2018, which is herein incorporated by reference in its entirety for all purposes.

BACKGROUND

Remote management of networks may involve a remote network management platform gathering information regarding the configuration and operational aspects of a managed network, and making this information available by way of a web-based graphical user interface. Through use of the graphical user interface these aspects of the managed network may be viewed, and possibly changed. Further, the remote network management platform may facilitate the design and implementation of workflows for processes and operations used by the managed network.

In order to enable these features, the remote network management platform communicates with the managed network. Several implementations of this communication may be possible. However, many of these implementations are complex to configure, or suffer from bottlenecks and/or duplicated effort that negatively impact performance.

SUMMARY

The embodiments herein introduce the use of multiple queues for communication between a remote network management platform and a managed network. Each queue may be dedicated to a particular application or a priority of traffic, for example. This architecture facilitates a more flexible configuration that can be tuned to the performance needs of the system. In some cases, a proxy queue in the managed network enables analysis of results prior to these results being placed in one or more of the multiple queues for delivery to the remote network management platform. The proxy queue can be scanned for opportunities to remove duplicated results, split large result entries into smaller chunks, and/or perform other beneficial operations.

Accordingly, a first example embodiment may involve a plurality of proxy server applications disposed within a managed network and a computational instance disposed within a remote network management platform. The remote network management platform may manage the managed network by way of the computational instance. The computational instance may contain a plurality of queues and facilitate the execution of a plurality of applications. Each of the plurality of applications may be configured to communicate with one or more of the proxy server applications by way of one or more of the plurality of queues. This communication may involve operations of: (i) selecting, by a particular application of the plurality of applications, a particular output queue of the plurality of queues, (ii) writing, by the particular application, a unit of work generated by the particular application to the particular output queue, (iii) retrieving, by a particular proxy server application of the plurality of proxy server applications, the unit of work from the particular output queue, (iv) carrying out, by the particular proxy server application, the unit of work, (v) writing, by the particular proxy server application, a result to a particular input queue of the plurality of queues, where the result represents an outcome of carrying out the unit of work, and where the particular input queue is associated with the particular output queue, and (vi) retrieving, by the particular application, the result from the particular input queue.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
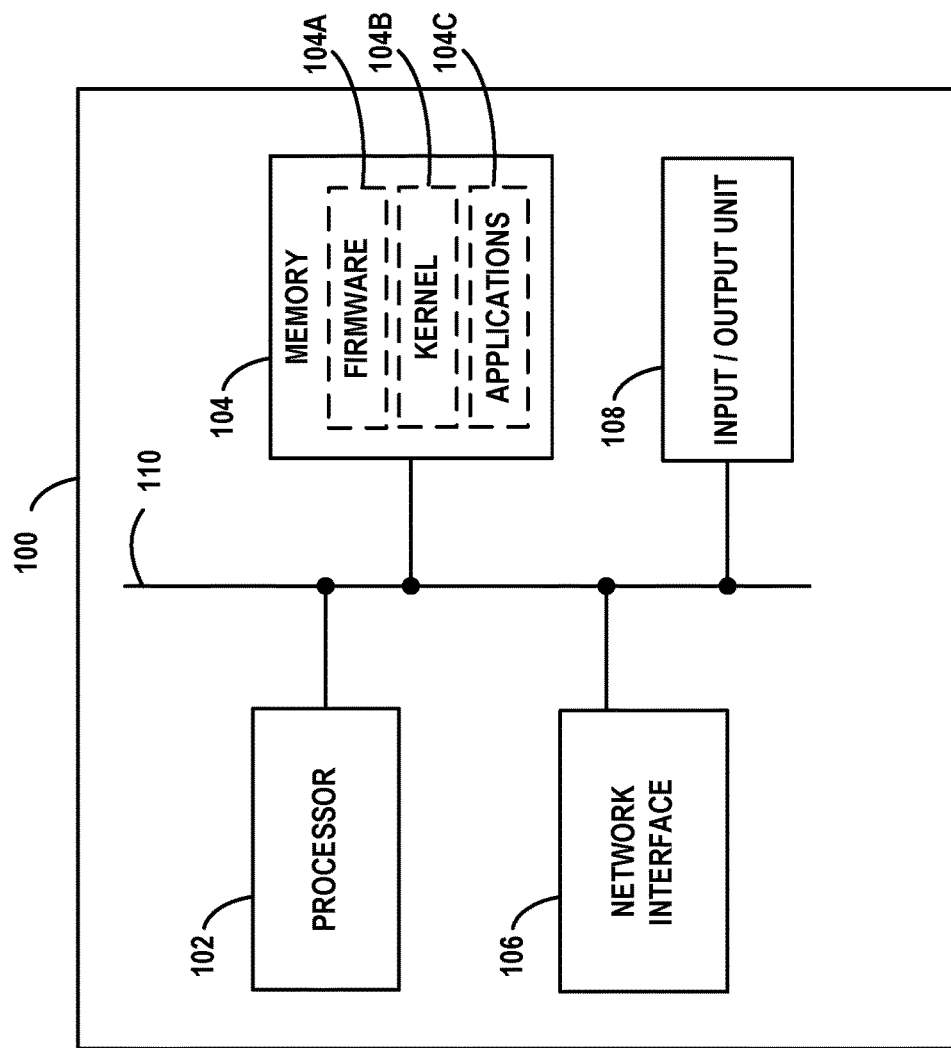
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
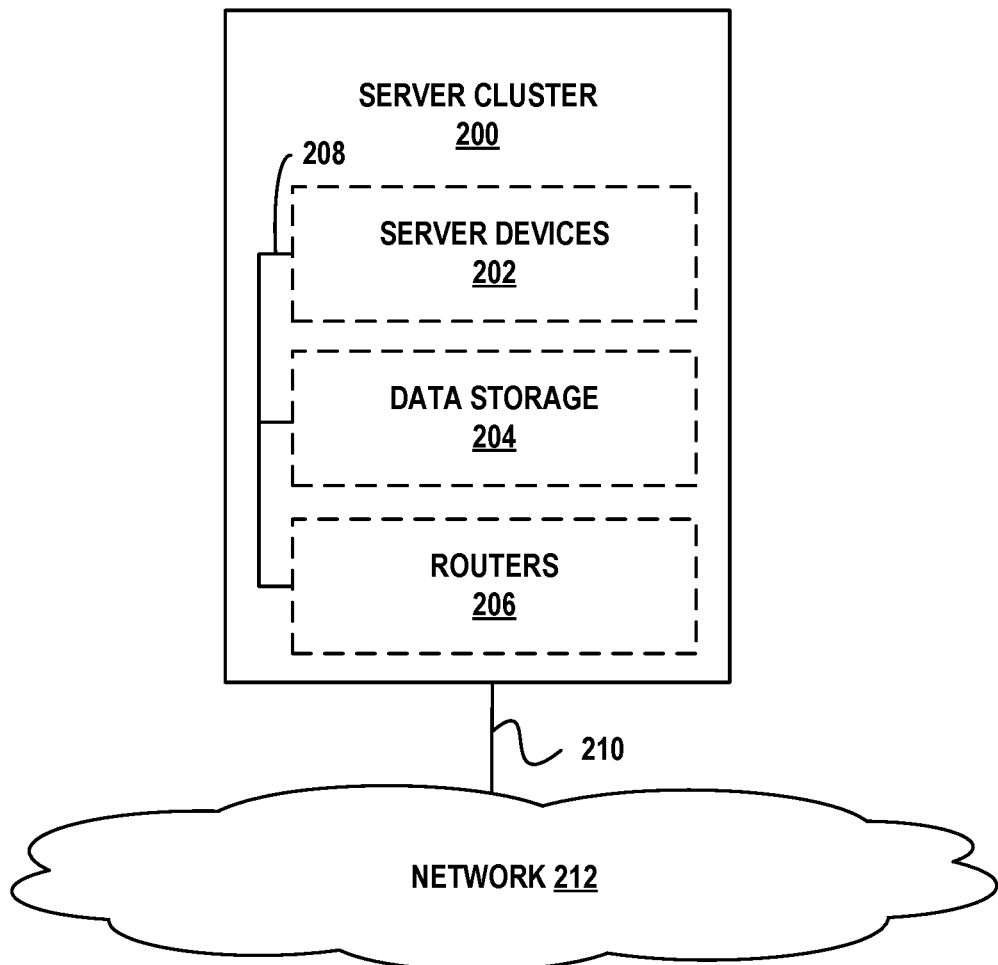
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
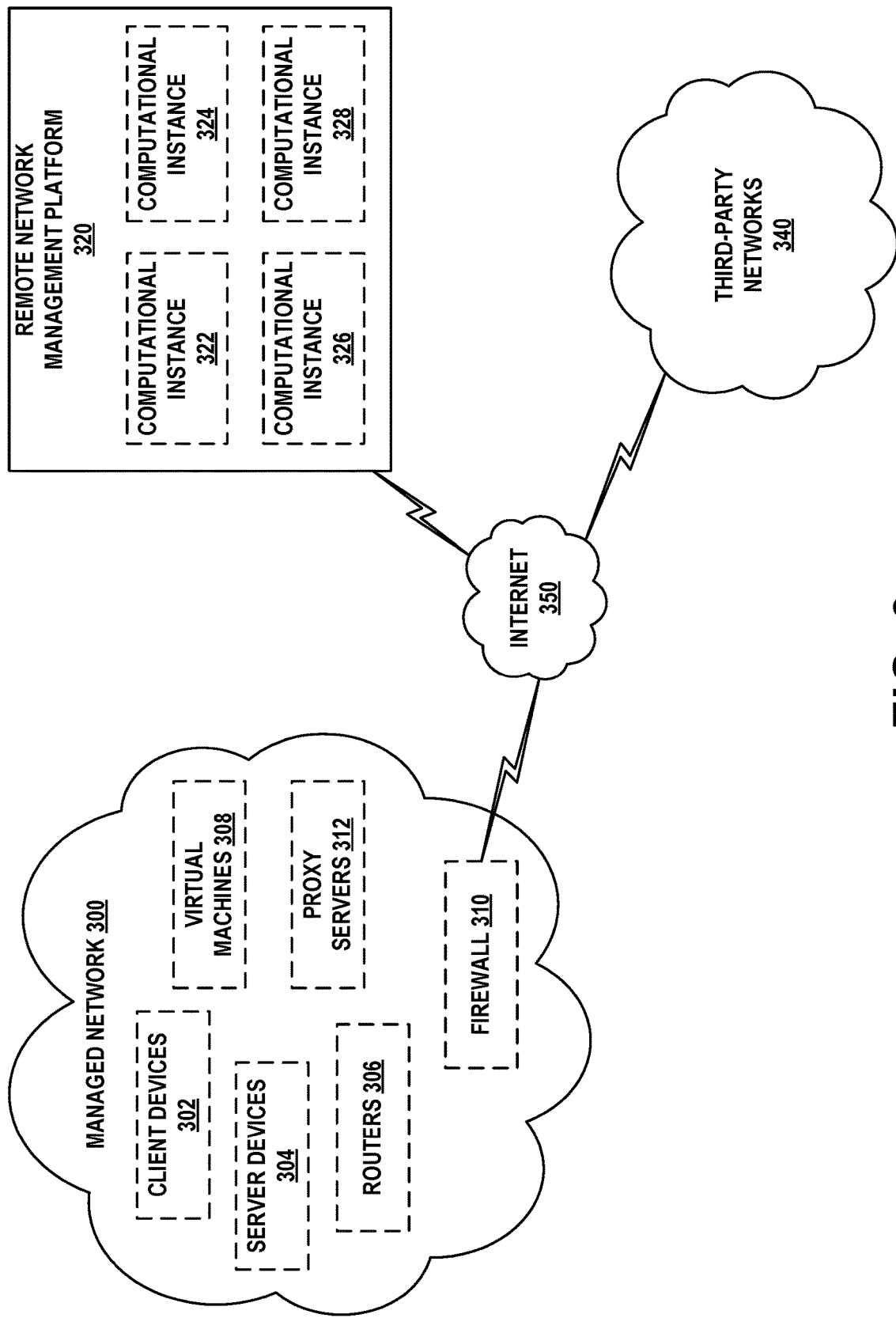
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
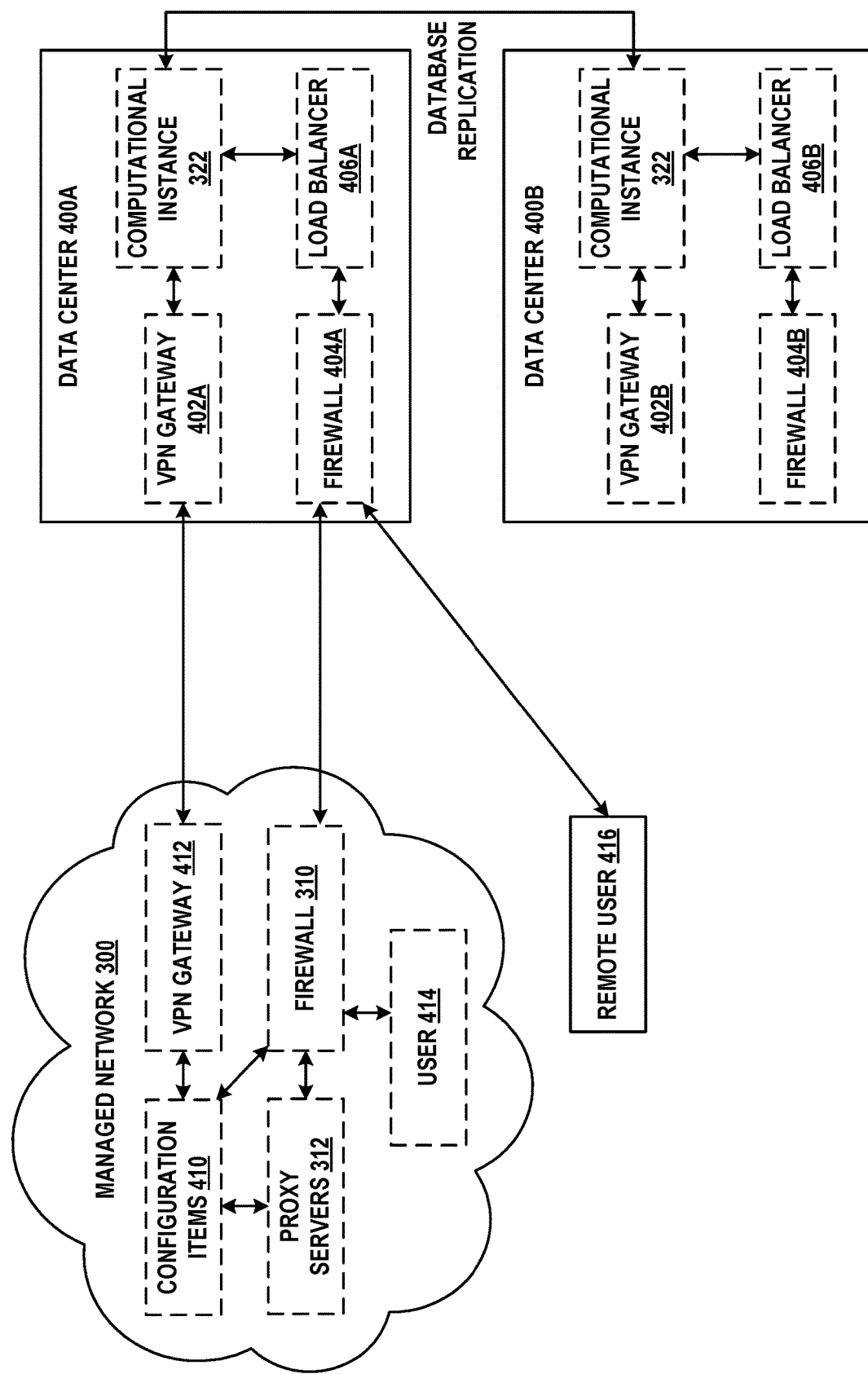
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
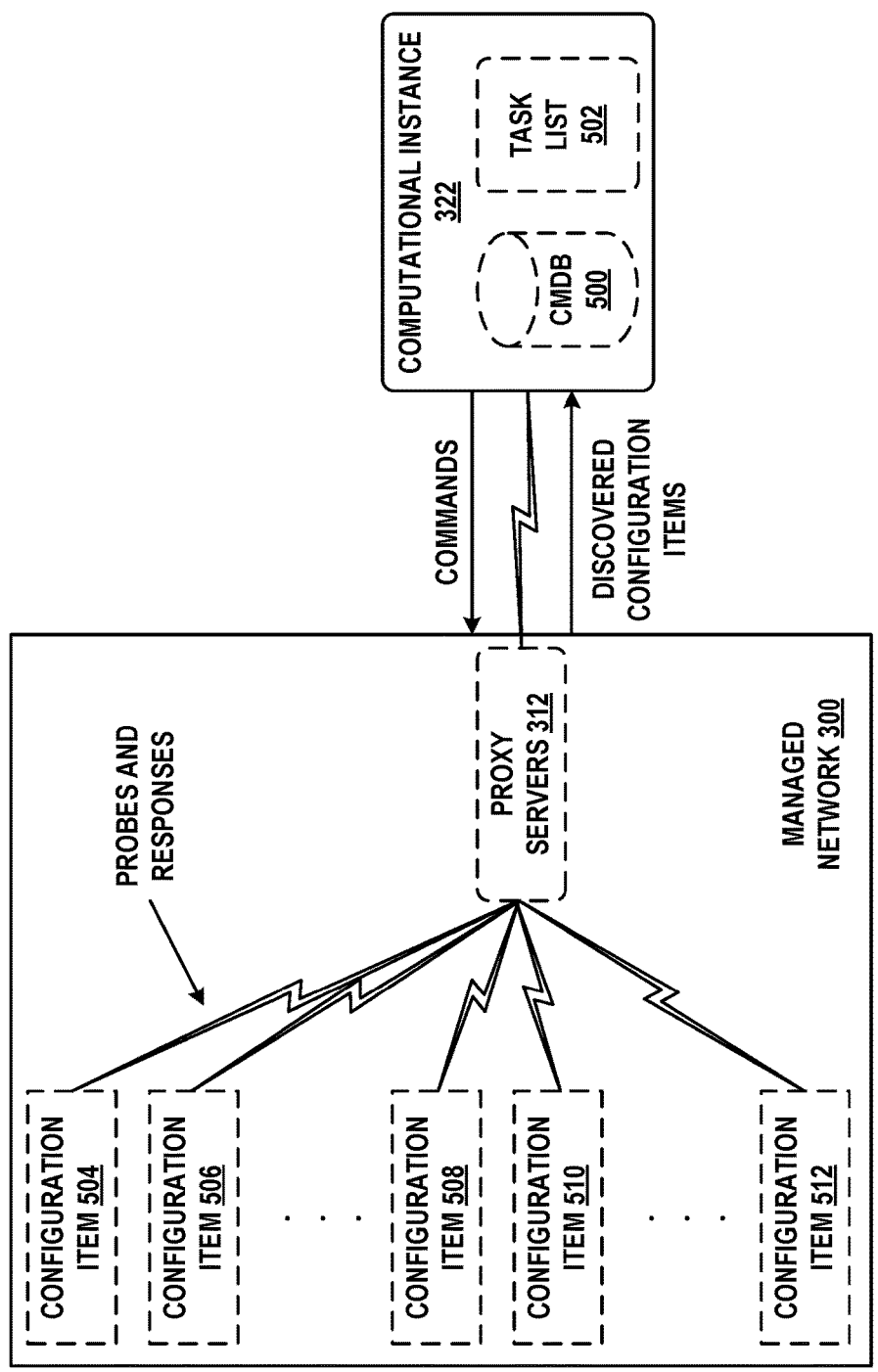
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
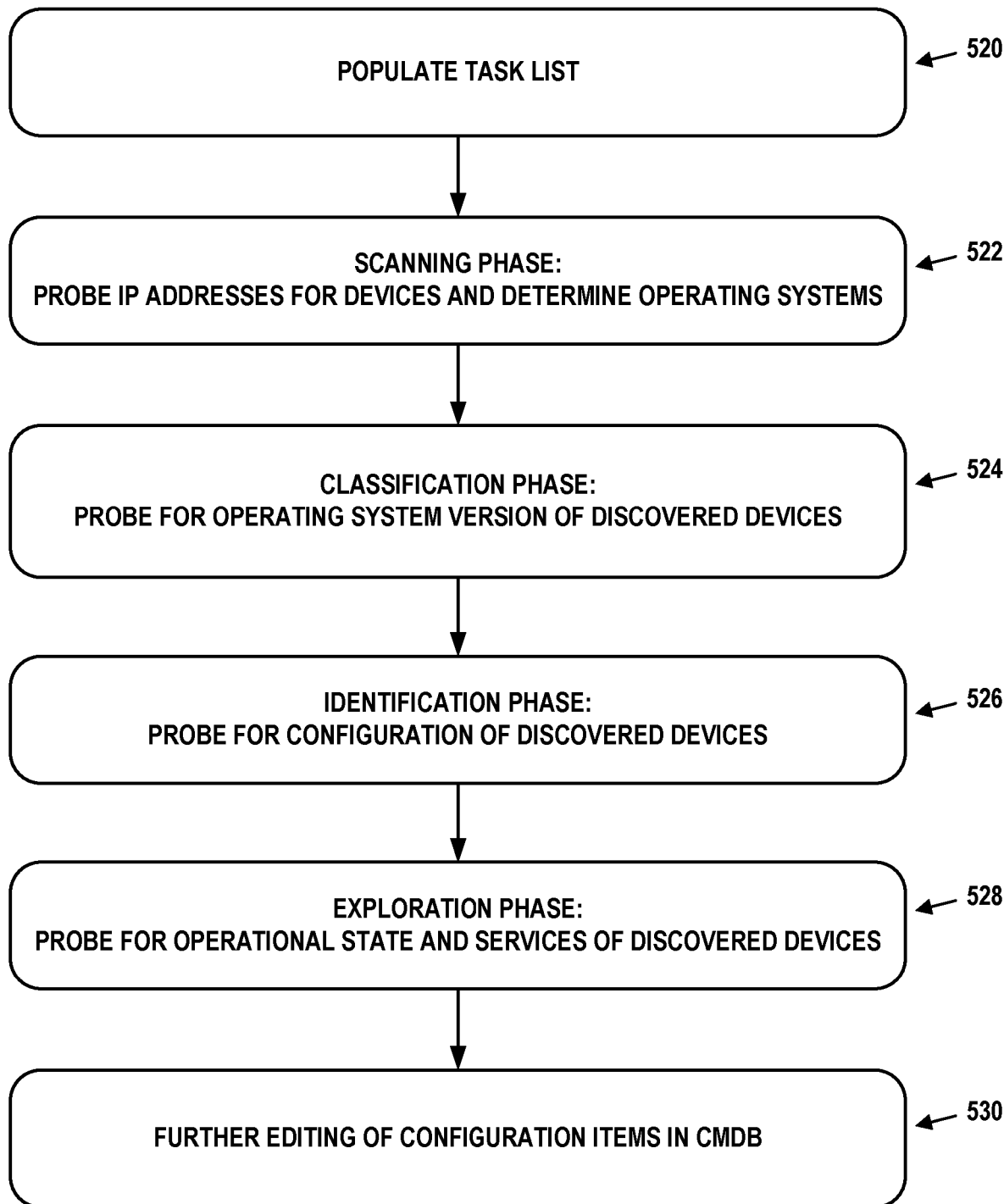
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE QUEUE MANAGEMENT

An aspect of discovery, as well as other types of activities involving a managed network and an associated computational instance, is how communication takes place between these entities. In some embodiments, each computational instance may include a queue that temporarily stores commands readable by the proxy servers of the associated managed network, as well as responses to these commands provided by the proxy servers for processing by the computational instance.

One possible implementation of such a queue is a database table or a file, both being persistent storage. Alternatively, non-persistent storage, such as main memory, could be used. Each output record in the queue may be a self-contained unit of work for the proxy servers to perform. Each result record in the queue may be a result, generated or obtained by the proxy servers, of one of the units of work. The proxy servers may retrieve and insert these records by way of web services, such as the Simple Object Access Protocol (SOAP) or a Representational State Transfer (REST) application programming interface (API). But other methods of access may be used.

Once the result is stored in the queue, a particular application may be triggered to read the associated result record from the queue (doing so might or might not remove the result record from the queue). For instance, if the unit of work is related to a discovery application, the discovery application may be informed of the presence of a discovery result in the queue, and may remove this result from the queue for discovery processing. As part of this processing, the CMDB of the computational instance may be updated with information in the result or derived from the result. Even if a unit of work or a result is removed from a queue, a record of the unit of work may be maintained in the database for purposes of record keeping, debugging, or later review.

Figure 6A:
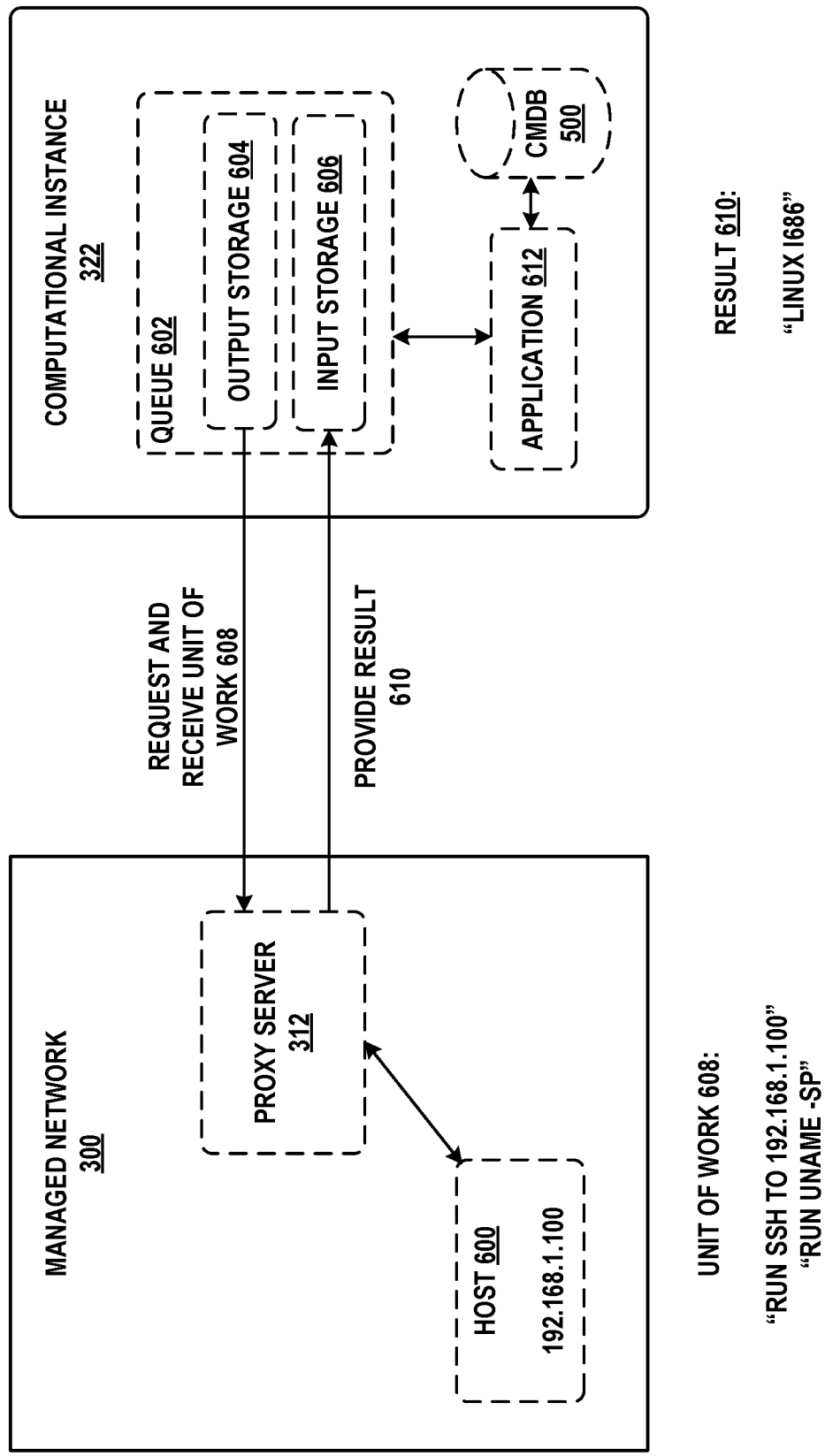
FIG. 6A depicts queuing in a remote network management platform, in accordance with example embodiments.

FIG. 6A provides an example of this architecture. Managed network 300 contains proxy server 312 and host 600, the latter having an IP address of 192.168.1.100. Computational instance 322 contains queue 602, application 612, and CMDB 500. Queue 602 includes output storage 604 (sometimes referred to as an output queue or request queue) and input storage 606 (sometimes referred to as an input queue or a result queue). Herein, a "host" may refer to any computing device or system that is disposed upon a network and assigned an IP address.

Proxy server 312 communicates with queue 602. This may entail proxy server 312 periodically or from time to time requesting and receiving a unit of work 608 from output storage 604 (if a unit of work is available). Unit of work 608 may be placed in output storage 604 by application 612, for instance. After processing and/or otherwise carrying out this unit of work, proxy server 312 may also provide an associated result 610 to input storage 606. Application 612 may process this result and store related information in CMDB 500.

As an illustration of this procedure, unit of work 608 may include commands to "run SSH to 192.168.1.100" and "run uname -sp". These commands instruct proxy server 312 to open an SSH connection to host 600 and invoke "uname -sp" on the command line. The latter command instructs host 600 to identify its operating system and processor version. Thus, result 610 may include the string "Linux i686" if host 600 is running the Linux operating system and using an i686 processor. In this manner, computational instance 322 can determine information about the hardware and software configuration of hosts on managed network 300.

Figure 6B:
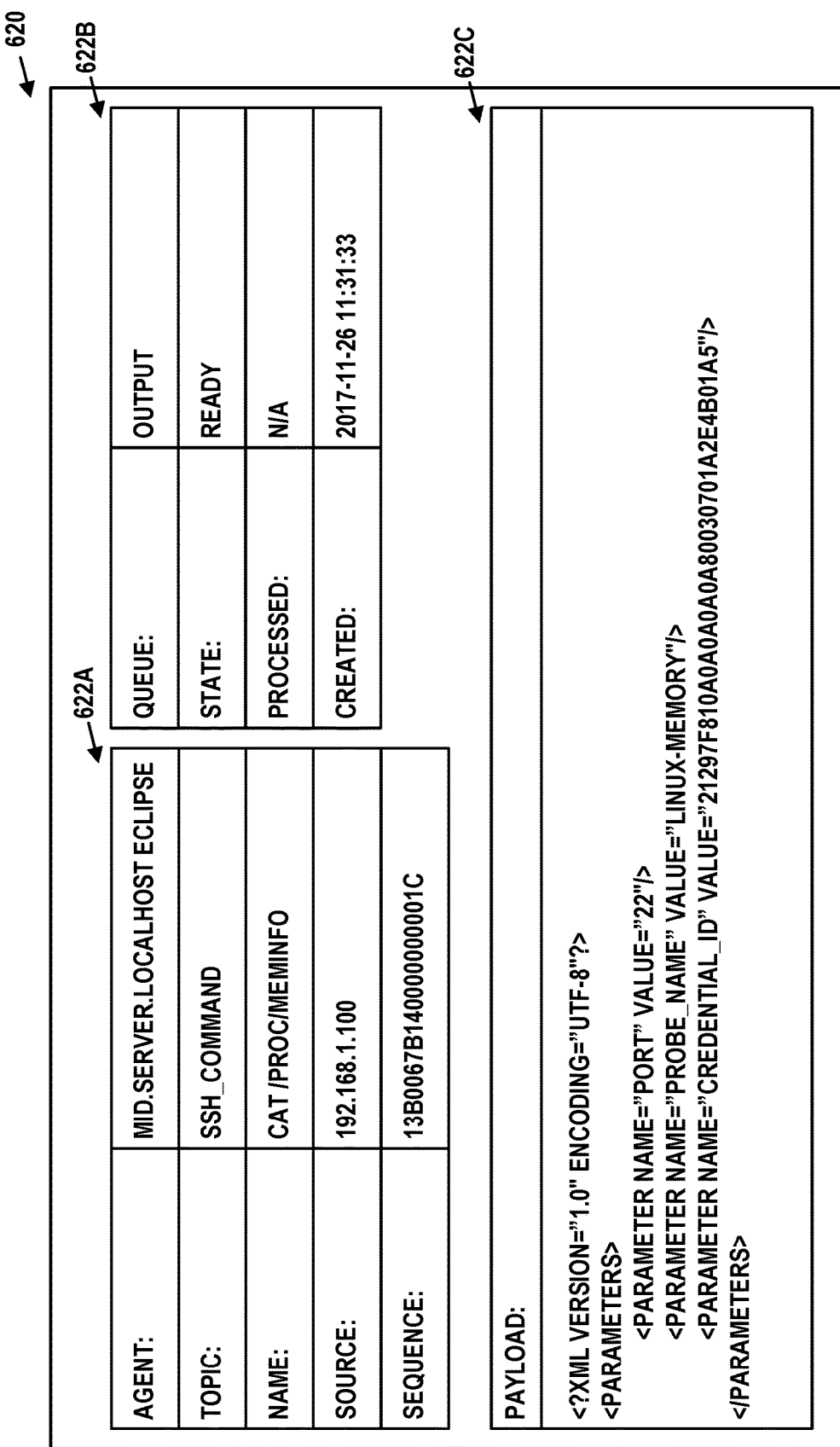
FIG. 6B depicts a user interface displaying content of a queued unit of work, in accordance with example embodiments.

FIG. 6B provides an example of a unit of work (the unit of work depicted in this figure is different from that of FIG. 6A). This example takes the form of graphical user interface 620, which could be a web page. To generate such a web page, computational instance 322 might read the unit of work from output storage 604 without removing it, and present this information in the form of HTML. Nonetheless, the formatting and presentation of the unit of work can vary.

As shown in FIG. 6B, the unit of work is made up of characteristics 622A, 622B, and 622C. The agent field of characteristics 622A identifies the proxy server to which the unit of work should be delivered. The agent may be specified by a character string, DNS name, IP address, or some other designation.

The topic field identifies the type of command contained within the unit of work. In this case, the topic is an SSH command. Other types of commands can include WINDOWS® PowerShell commands, Java Database Connectivity (JDBC) commands, and so on.

The name field identifies the actual command string to be executed. In this case, the string is the UNIX shell command "cat/proc/meminfo", which provides command line output regarding memory configuration and usage of a host. Possible values of the name field may depend upon the value of the topic field.

The source field identifies an IP address of the host that is the intended recipient of the unit of work. In this case, the source field specifies 192.168.1.100, the IP address of host 600.

The sequence field identifies a sequence number of the unit of work, which can be used to match the unit of work with an associated result. Sequence numbers can be generated sequentially, randomly, or according to some other mechanism so long as the likelihood of two units of work having the same sequence number is reasonably low.

Turning to characteristics 622B, the queue field identifies whether the unit of work is output (i.e., queued for retrieval by a proxy server) or input (i.e., queued for retrieval by an application of the computational instance. In this case, queue field species output, which means that the unit of work is output from queue 602, and is either stored in or was stored in output storage 604.

The state field identifies whether the unit of work has been processed. Thus, the state field may specify that the unit of work is ready (ready for processing), processing (currently being delivered or having been delivered to proxy server 312, and computational instance 322 is awaiting a result), or processed (completed and removed from the queue). In FIG. 6B, the state field indicates that the unit of work is ready for processing.

The processed field identifies the time at which the processing of the unit of work completed. This indication may be, for example, a time stamp. In this case, the processed field indicates, consistent with the value of the state field, that the unit of work has not yet been processed.

The created field identifies the time at which the unit of work was created. This indication may be, for example, a time stamp. In this case, the created field indicates that the unit of work was created on Nov. 26, 2017 at 11:31:33 AM.

Turning to characteristics 622C, the payload field identifies free-form text that can be used to represent any other pieces of information needed or useful to specify the unit of work. In this case, this information is encoded using XML. Still, other formats such as JavaScript Object Notation (JSON) may be used instead or in addition to XML. The payload field of characteristics 622C includes a port parameter with a value of 22, a probe_name parameter with a value of Linux-memory, and a credential_id with a value represented by a hexadecimal string. The port parameter indicates which destination TCP port number should be used for the SSH connection to IP address 192.168.1.100. The probe_name parameter specifies a name for the activity carried out by the unit of work. The credential_id parameter identifies a set of credentials (e.g., userid and password) that are accessible to proxy server 312 and are to be used to establish the SSH connection. The payload field may contain more or fewer parameters.

Figure 6C:
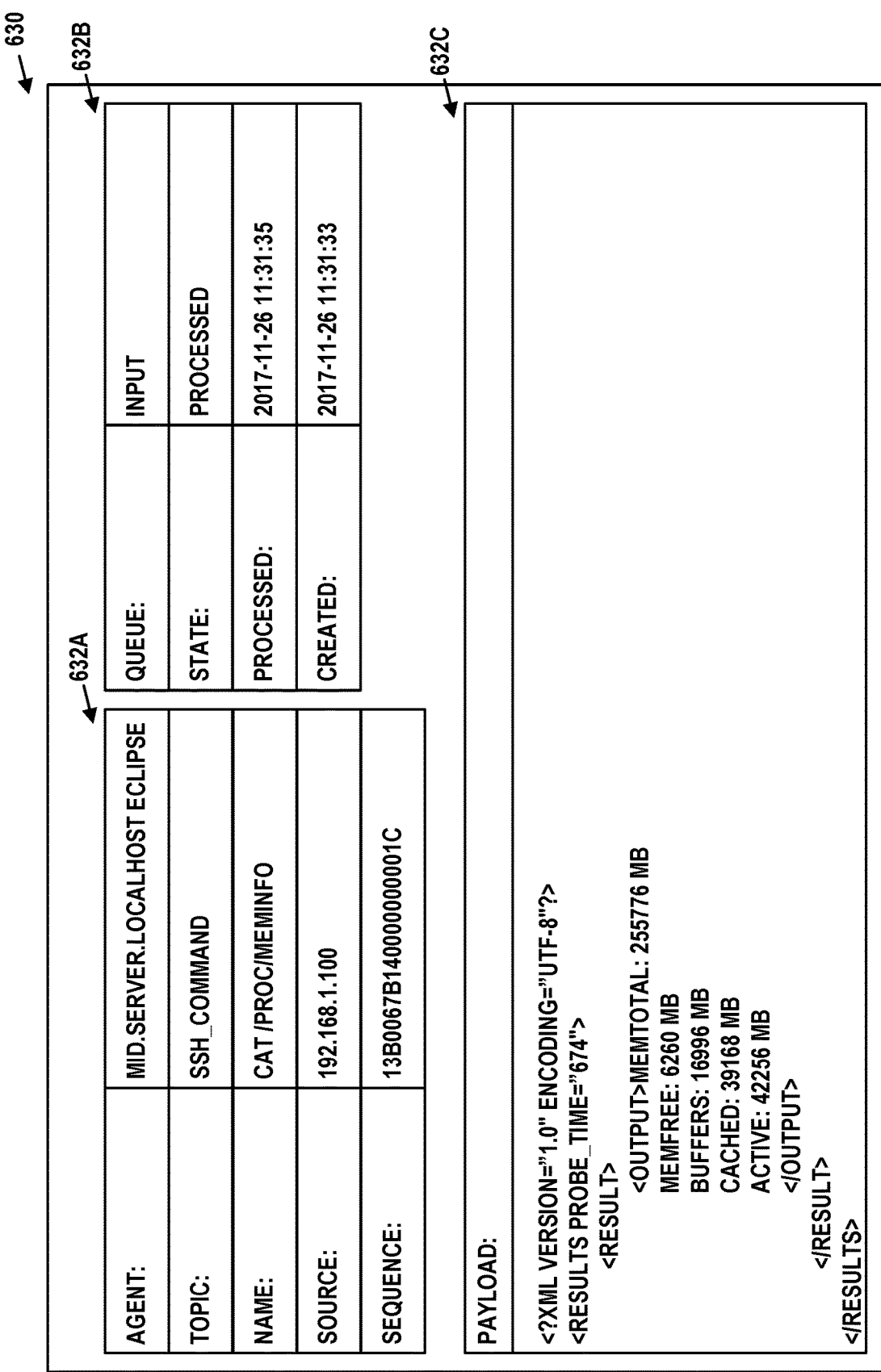
FIG. 6C depicts a user interface displaying content of a result, in accordance with example embodiments.

FIG. 6C provides an example result generated by proxy server 312 in response to receiving and processing the unit of work illustrated in FIG. 6B. For instance, proxy server 312 may receive the unit of work, responsively log in to host 600 using SSH with the specified port number and credentials, then run "cat/proc/meminfo" on the command line and receive the output of this command. This output may be used as the result of the carrying out the unit of work. In FIG. 6C, the example result takes the form of graphical user interface 630, such as a web page. Nonetheless, the formatting and presentation of the result can take the form of various embodiments.

As shown in FIG. 6C, the unit of work is made up of characteristics 632A, 632B, and 632C. The agent, topic, name, source, sequence, and created fields of characteristics 632A and 632B are identical to those of the unit of work depicted in FIG. 6B. However, the queue, state, and processed fields take on different values than the unit of work.

The queue field specifies input, which means that the result is input to queue 602, and is either stored in or was stored in input storage 606. The state field specifies that the unit of work associated with the result has been processed. The processed field specifies that this processing completed on Nov. 26, 2017 at 11:31:35 AM.

Not unlike the payload field of characteristics 622C, the payload field of characteristics 632C identifies free-form text that can be used to represent any other pieces of information needed or useful to specify the result. In this case, this information is encoded using XML, but other formats such as JSON may be used instead or in addition to XML. The payload field of characteristics 632C includes a listing of how memory is allocated in host 600. For instance, there are a total of 255776 megabytes of memory, of which 6260 megabytes are free, 16996 megabytes are allocated to buffers, 39168 megabytes are used for caching, 42256 megabytes are being actively used (e.g., by applications) and so on. In some embodiments, the list of memory allocations may be longer or shorter.

This result can be read and removed from input storage 606 by an application executing on computational instance 322, such as application 612. Usually, this application (or a related program) may deposit the unit of work in output storage 604 and then wait for a result to be placed into input storage 606.

For instance, a discovery application, such as the one described above, may issue a unit of work, then obtain the result and place some of the information therein into CMDB 500. Likewise, a service mapping application (e.g., an application that attempts to determine hierarchical relationships and dependencies between a set of interconnected applications and hosts configured to operate on managed network 300) may issue a different unit of work, and then use its result in a similar fashion. Also, an event management application may issue a unit of work that requests that system health and stability monitoring software tools operating on managed network 300 proactively report certain types of events. These events might be, for example, memory utilization of a device exceeding a pre-determined threshold, a device becoming unreachable or unresponsive, an application operating on managed network 300 raising an error, and so on. Proxy server 312 may receive reports of these events and place representations thereof in queue 602. In some cases, user-defined applications may also employ queue 602 in a similar fashion.

There are various advantages and disadvantages to the architecture of FIG. 6A. In general, it is expected that computational instance 322 will have greater computational resources (e.g., processor and memory capacity) than managed network 300. Thus, by placing queue 602 within computational instance 322 rather than managed network 300, these resources can be utilized for the processing and management of queue 602. This, in turn, allows proxy server 312 (particular, the application thereon that carries out proxy server operations) to be simpler and maintain less state.

By storing the units of work and results of queue 602 in database tables, this information can be easily backed up. For instance, writes to these database tables may be replicated across two or more physical databases. Then, if one of these databases fails, another of the databases can be used in its place with little or no impact on service.

Furthermore, by placing all units of work and results in a single queue (here, output storage 604 and input storage 606 are considered to be part of the same logical queue, namely queue 602), this single queue serves as a centralized communication dispatch point between one or more proxy servers on managed network 300 and applications on computational instance 322. Therefore, rather than having to learn about and communicate directly with each of these applications, proxy server 312 may be configured to communicate with computational instance 322 only by way of queue 602. Likewise, each of these applications does not need to be configured to communicate with one or more proxy servers, and instead need only issue units of work and receive results by way of queue 602.

Figure 7A:
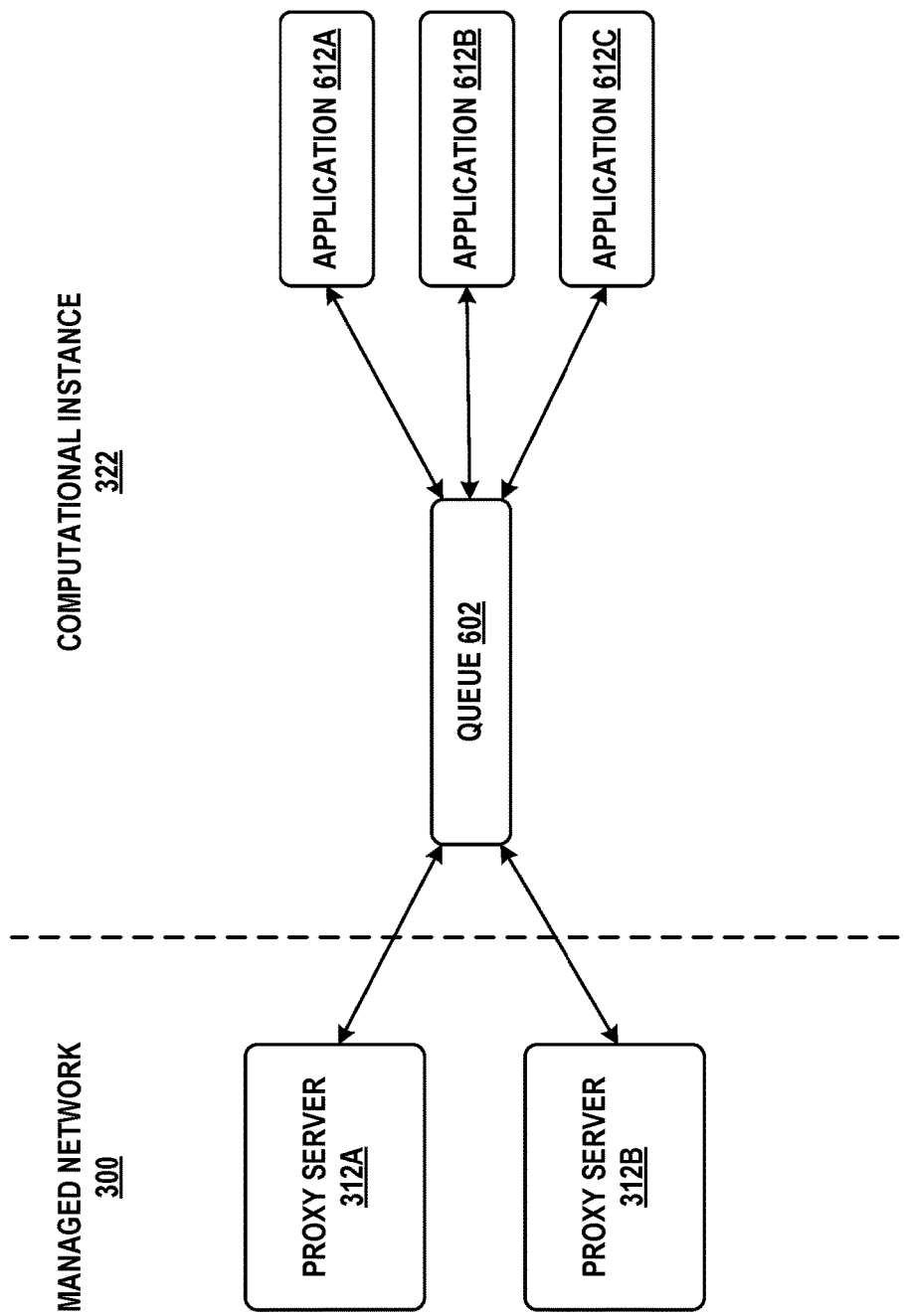
FIG. 7A depicts a queueing arrangement for a remote network management architecture, in accordance with example embodiments.

FIG. 7A depicts these characteristics in arrangement 700. In this arrangement, managed network 300 includes proxy servers 312A and 312B. Computational instance 322 contains queue 602 and hosts applications 612A, 612B, and 612C. Both of proxy servers 312A and 312B can communicate with applications 612A, 612B, and 612C by way of queue 602. Thus, queue 602 serves as a centralized dispatch point for messaging between managed network 300 and computational instance 322.

It is assumed that each unit of work encodes or is associated with a representation of the proxy server to which it is intended to be delivered. Likewise, each result may encode or being associated with the application to which it is intended to be delivered. This allows information placed in queue 602 to be properly multiplexed and de-multiplexed.

Despite its advantages, the architecture of FIG. 6A (as depicted in arrangement 700 of FIG. 7A) also has drawbacks and limitations. One example is that there is a maximum size within which results must fit. This size may be 1 megabyte, 5 megabytes, 10 megabytes or some other quantity. Such a limit is usually necessary to prevent writes and reads of queue 602 from consuming too many resources of computational instance 322. As an example, if a 10 gigabyte result were written to queue 602, doing so may slow down the rate at which applications 612A, 612B, and 612C can communicate with proxy servers 312A and 312B for several seconds or more, and/or may lead to software instability. Large units of work and results also cause head-of-line blocking, in which one large entry in a queue takes so long to be removed and/or processed that entries behind it in the queue are delayed to the point that their associated applications are negatively impacted.

Furthermore, when implemented as a single logical queue, queue 602 cannot easily facilitate differentiation between of units of work and results associated with different applications or different priorities. For example, it may be desirable for event management applications operating on computational instance 322 to receive events as quickly as possible, while discovery and service mapping applications operating on computational instance 322 might not exhibit the same urgency. But, high-priority results may be placed behind lower priority results in queue 602, causing these high priority results to be delayed and further causing potential degradations in system performance.

Additionally, some types of applications that use queue 602 might generate redundant results or new results that override or duplicate previously-queued results. For instance, discovery procedures, if not configured properly, could "discover" the same computing devices more than once. Therefore, devices may be represented in multiple entries in queue 602. Similarly, event management applications might report multiple events representing the same state of a computing device. As an example, system health and stability monitoring software tools operating on managed network 300 might periodically report (e.g., every few seconds) when a parameter of a computing device (e.g., memory utilization or processor utilization) on managed network 300 is out of range. Therefore, there may be multiple events in queue 602 containing this information.

VI. IMPROVED QUEUE MANAGEMENT

Figure 7B:
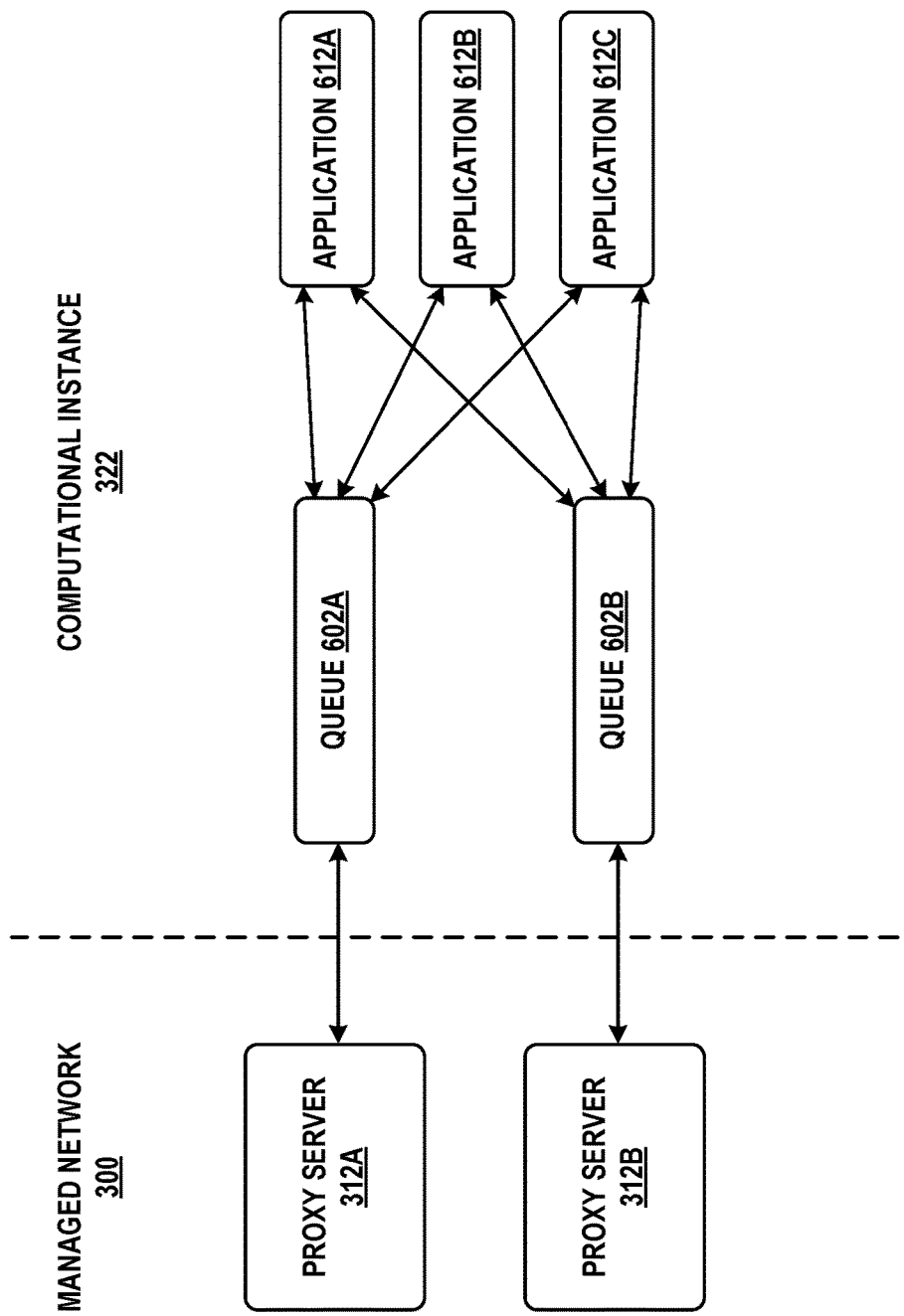
FIG. 7B depicts a queueing arrangement for a remote network management architecture, in accordance with example embodiments.
Figure 7C:
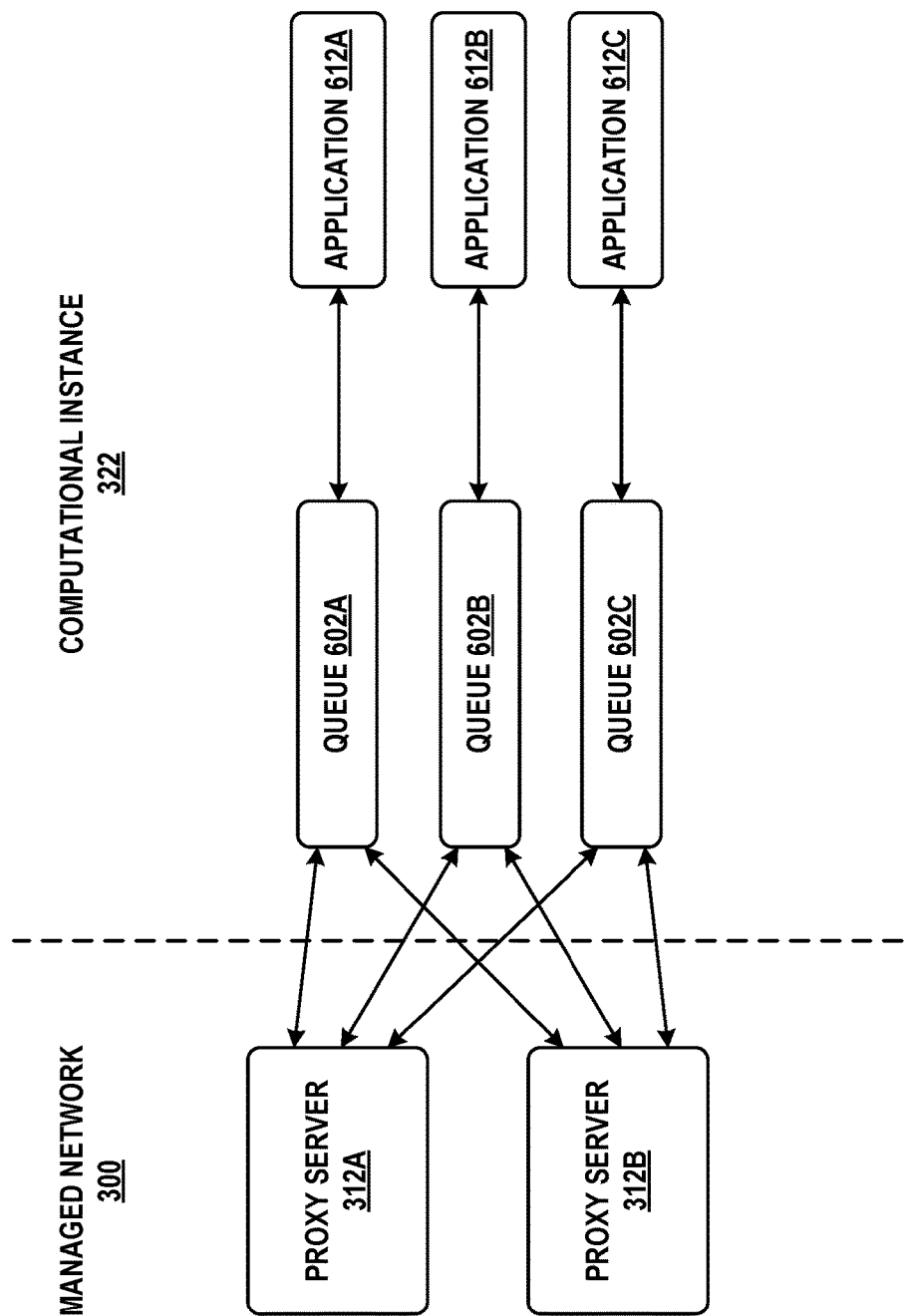
FIG. 7C depicts a queueing arrangement for a remote network management architecture, in accordance with example embodiments.
Figure 7D:
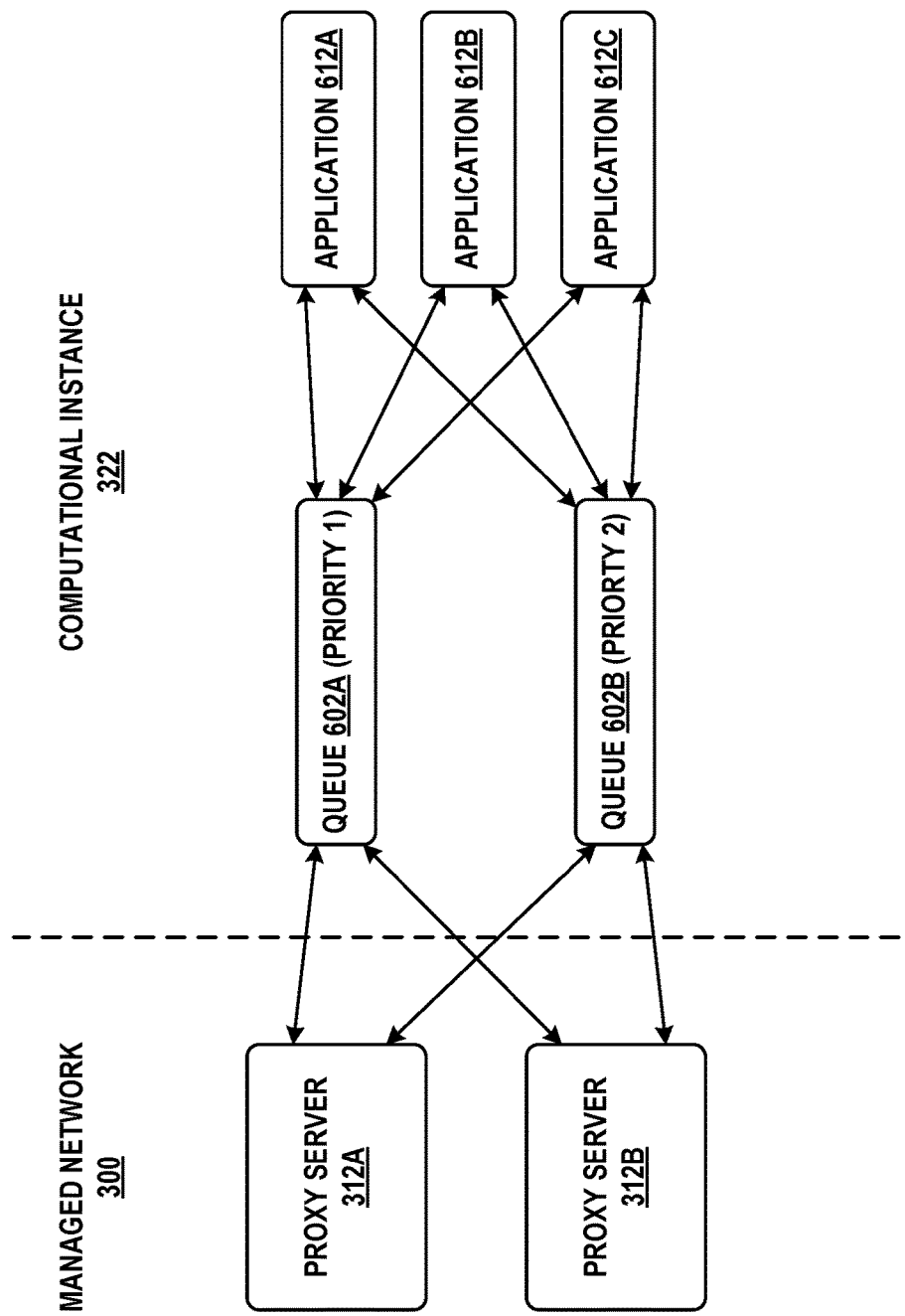
FIG. 7D depicts a queueing arrangement for a remote network management architecture, in accordance with example embodiments.

The embodiments herein generalize the single-queue approach depicted in FIGS. 6A and 7A to a multiple-queue approach that addresses the aforementioned problems. There are several possible ways of determining how many queues should be used, and which units of work (and their corresponding results) should be assigned to each queue. FIGS. 7B-7D explore some of these possibilities.

Arrangement 702 of FIG. 7B involves queue 602 of FIG. 7A being replaced by two queues, namely queues 602A and 602B. These queues are respectively dedicated to a particular proxy server. Thus, queue 602A is dedicated to proxy server 312A and queue 602B is dedicated to proxy server 312B. Arrangement 702 is a simplified example of an architecture in which n queues are respectively dedicated to n proxy servers, where n is at least 2.

On the other hand, each of applications 612A, 612B, and 612C is configured to communicate with managed network 300 by way of both of queues 602A and 602B. Thus, for example, application 612A may issue, to queue 602A, units of work that are to be carried out by proxy server 312A. Application 612A may also issue, to queue 602B, units of work that are to be carried out by proxy server 312B. Proxy server 312A, in turn, only retrieves units of work from queue 602A and writes associated results thereto, and proxy server 312B only retrieves units of work from queue 602B and write associated results thereto.

Arrangement 702 generally requires applications 612A, 612B, and 612C to be configured in advance with regard to the capabilities of proxy servers 312A and 312B, proxy server IP addresses and/or subnets, and possibly other criteria, so that the applications can determine in which queue a particular unit of work should be placed in order to be carried out by the appropriate proxy server. However, if proxy servers 312A and 312B are located in geographically or topologically different areas, such a configuration would naturally result from the distributed network architecture. Alternatively, if proxy server 312A and proxy server 312B are co-located, the applications may place units of work in either queue. Doing so may serve to balance load across the queues and across the proxy servers.

In general, arrangement 702 provides a way of reducing the bottlenecks and other drawbacks of a single-queue arrangement. Some head-of-line blocking may be mitigated, causing faster overall delivery of results.

Arrangement 704 of FIG. 7C involves queue 602 of FIG. 7A being replaced by three queues, namely queues 602A, 602B, and 602C. These queues are respectively dedicated to a particular application. Thus, queue 602A is dedicated to application 612A, queue 602B is dedicated to application 612B, and queue 602C is dedicated to application 612C. Arrangement 704 is a simplified example of an architecture in which n queues are respectively dedicated to n applications, where n is at least 2.

On the other hand, each of proxy servers 312A and 312B is configured to communicate with computational instance 322 by way of each of queues 602A, 602B, and 602C. Thus, for example, application 612A may issue, to queue 602A, units of work that are to be carried out by proxy server 312A. Application 612B may issue, to queue 602B, units of work that are also to be carried out by proxy server 312A. Proxy server 312A, in turn, retrieves units of work from both queues 602A and 602B, and writes associated results back to these respective queues.

Arrangement 704 generally requires that both of proxy servers 312A and 312B are configured to check each of queues 602A, 602B, and 602C at the appropriate frequency. This may result in some extent of additional operations being carried out by the proxy servers. On the other hand, the applications only need to be configured to communicate by way of a single queue.

Like arrangement 702, arrangement 704 provides a way of reducing the bottlenecks and other drawbacks of a single-queue arrangement. Some head-of-line blocking may be mitigated, causing faster overall delivery of results. Furthermore, arrangement 704 logically associates queues with applications, so that applications that are delay-sensitive (e.g., event management) are less impacted by applications that are not delay-sensitive (e.g., discovery). In other words, event management results are not unduly delayed by being queued behind discovery results. Therefore, arrangement 704 may be used as a de facto per-application prioritization mechanism.

Arrangement 706 of FIG. 7D provides a more general prioritization mechanism. Queue 602A is dedicated to high-priority (priority 1) units of work and their associated results, while queue 602B is dedicated to low-priority (priority 2) units of work and their associated results. Both of proxy servers 312A and 312B, as well as all of applications 612A, 612B, and 612C, may use either queue. Arrangement 706 is a simplified example of an architecture in which n queues are respectively dedicated to n priority levels, where n is at least 2.

For each unit of work generated by an application, the application determines its relative priority, and then places the unit of work in an appropriate queue. While some applications may assign the same priority to all of the units of work that they generate, others may generate units of work with varying priorities. For example, an event management application may manage events of varying criticalities, and may determine how to queue the associated units of work accordingly.

While arrangement 706 is somewhat more complex than arrangements 702 and 704, in that all proxy servers and applications may be configured to use all of the queues, it is also more flexible. Head of line blocking and bottlenecks may be mitigated or eliminated by having enough queues and assigning units of work to these queues appropriately.

While each have their respective advantages, none of arrangements 702, 704, or 706 specifically address the aforementioned issues related to the size limit of units of work and redundant results. Arrangement 708 of FIG. 7E can be used to resolve these issues.

Unlike arrangements 700, 702, 704, and 706, arrangement 708 focuses on modifications to proxy server 312. Thus, arrangement 708 may be used in conjunction with these other arrangements, as an optional feature for any. Therefore, while FIG. 7E only depicts one queue (queue 602) in computational instance 322, any number of queues may be present and proxy server 312 may be configured to communicate by way of one or more of these queues.

As depicted, proxy server 312 includes proxy queue 710 and proxy queue manager 712. Proxy queue manager 712 may be a software application for managing proxy queue 710. Proxy queue 710 may be used to store results that are intended to be placed in queue 602 (more specifically, input storage 606). Thus, proxy queue includes a head and a tail, and proxy queue manager writes incoming results to the tail and reads outgoing results from the head, placing these read results into queue 602.

Figure 7E:
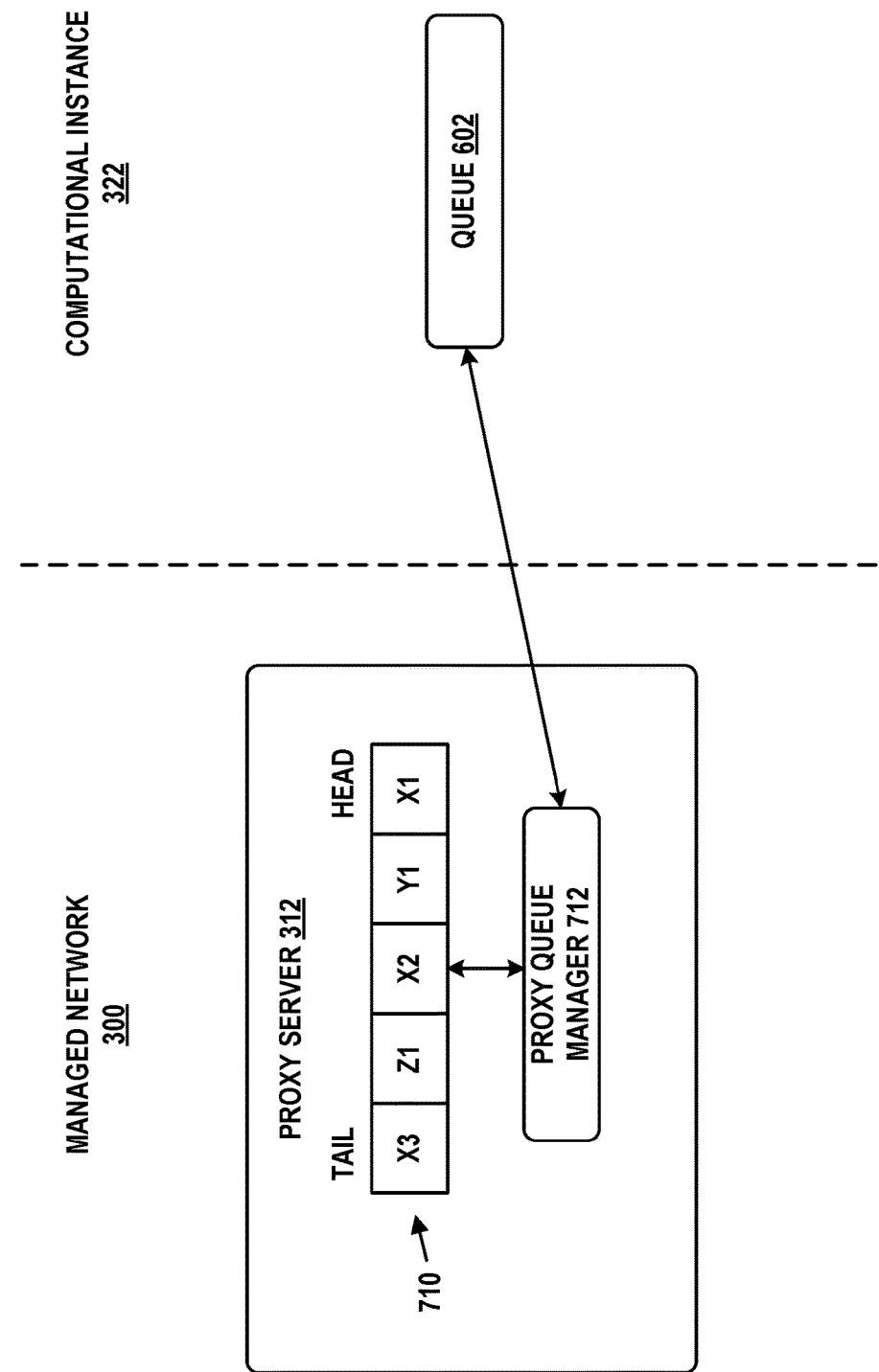
FIG. 7E depicts a queueing arrangement for a remote network management architecture, in accordance with example embodiments.

At any point in time, proxy queue 710 may include one or more results. In FIG. 7E, these results are encoded by requesting application and number. Thus, proxy queue 710 includes three results for application X (results X1, X2, and X3), as well as one result for application Y (Y1) and one result for application Z (Z1).

Particularly, proxy queue manager 712 may hold some results in proxy queue 710 for a period of time (e.g., a few seconds). This may allow other results associated with the same application to accumulate in proxy queue 710. Then, proxy queue manager 712 may examine these queued results to determine whether any can be combined or removed.

For example, results X1, X2, and X3 are all intended to be provided to application X. In some cases, results X2 and X3 may be redundant copies of the same information that is in result X1. In this case, proxy queue manager 712 may delete results X2 and X3 (or results X1 and X2) from proxy queue 710, thereby reducing the load on the system and the processing required to deliver results to application X. Alternatively, results X2 and X3 (or results X1 and X2) may be merged together if they are at least partially overlapping.

Alternatively or additionally, proxy queue manager 712 may determine if any of the queued results exceed the size limit of queue 602. If that is the case, proxy queue manager 712 may remove the result from proxy queue 710, split the result into two or more separate results, and then place each of these separate results in proxy queue 710. For instance, if a large result is in the form of an XML or JSON file, proxy queue manager 712 might split this one file into two or more separate, syntactically correct XML or JSON files. Doing so may allow computational instance 322 to process these files in parallel if multiple worker threads are supported.

In this fashion, both result redundancy and result size limit issues can be addressed appropriately. Nonetheless, arrangement 708 does add state and complexity to proxy server 312. As a consequence, it may be beneficial to store proxy queue 710 as a table in a redundant database, or use some other form of high availability mechanism to mitigate data loss if proxy server 312 crashes, becomes unresponsive, or otherwise fails.

VII. EXAMPLE OPERATIONS

Figure 8:
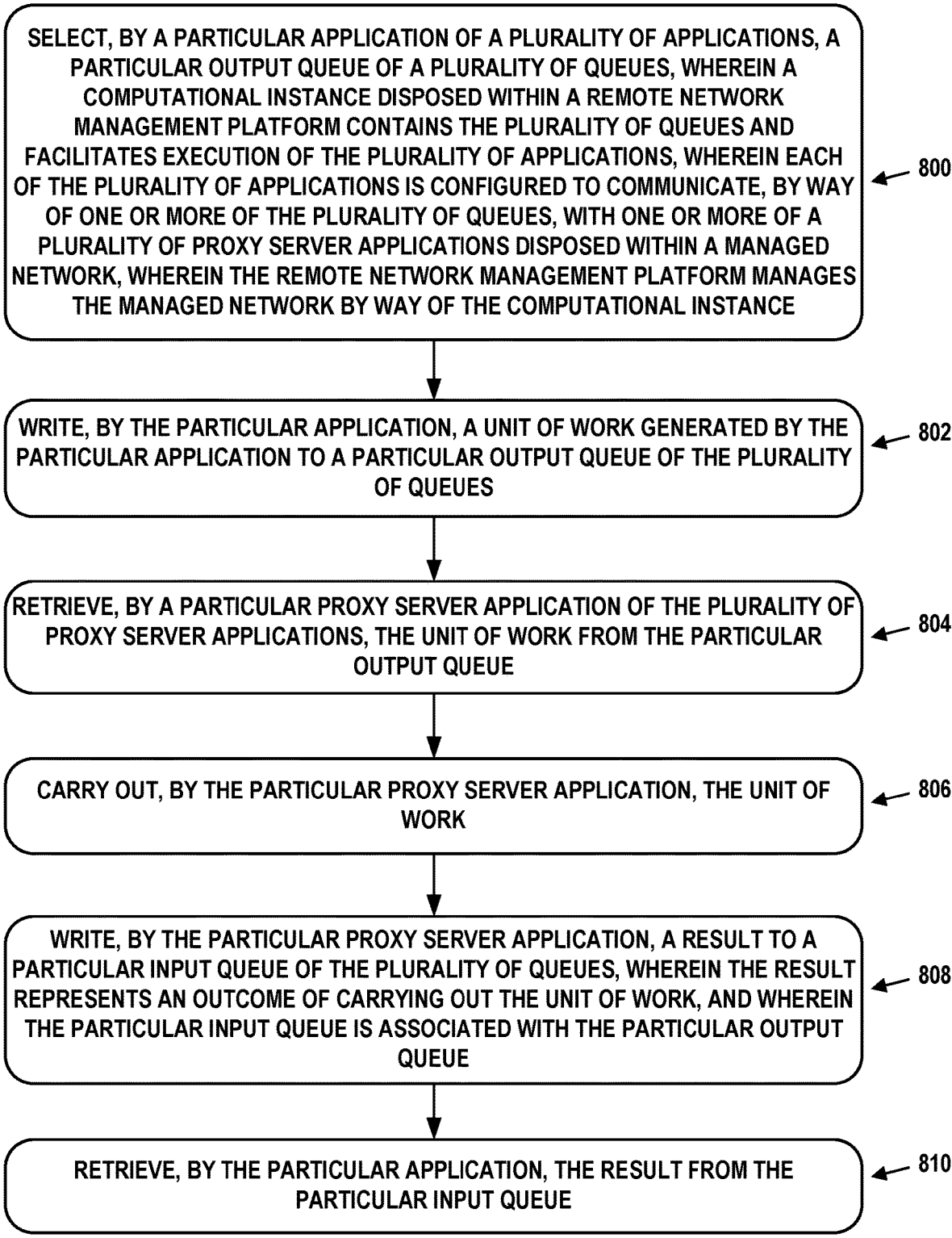
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve selecting, by a particular application of a plurality of applications, a particular request (output) queue of a plurality of queues. A computational instance disposed within a remote network management platform may contain the plurality of queues and facilitate execution of the plurality of applications. Each of the plurality of applications may be configured to communicate, by way of one or more of the plurality of queues, with one or more of a plurality of proxy server applications disposed within a managed network. The remote network management platform may manage the managed network by way of the computational instance.

Block 802 may involve writing, by the particular application, a unit of work generated by the particular application to a particular request (output) queue of the plurality of queues.

Block 804 may involve retrieving, by a particular proxy server application of the plurality of proxy server applications, the unit of work from the particular request (output) queue.

Block 806 may involve carrying out, by the particular proxy server application, the unit of work.

Block 808 may involve writing, by the particular proxy server application, a result to a particular result (input) queue of the plurality of queues. The result may represent an outcome of carrying out the unit of work. The particular result (input) queue may be associated with the particular request (output) queue.

Block 810 may involve retrieving, by the particular application, the result from the particular result (input) queue.

Some embodiments may involve a one-to-one relationship between the proxy server applications and the queues. Each of the plurality of proxy server applications may use a respectively dedicated queue (e.g., paired request (output) and result (input) queues) of the plurality of queues to communicate with the plurality of applications.

Some embodiments may involve a one-to-one relationship between the applications and the queues. Each of the plurality of applications may use a respectively dedicated queue (e.g., paired request (output) and result (input) queues) of the plurality of queues to communicate with the plurality of proxy server applications.

In some embodiments, each of the plurality of queues is associated with a different priority. Writing the unit of work generated by the particular application in the particular request (output) queue may be based on matching a priority of the unit of work with the priority associated with the particular request (output) queue. A time at which the particular proxy server application retrieves the unit of work from the particular request (output) queue may be based on the priority associated with the particular request (output) queue.

In some embodiments, the particular proxy server application contains: (i) a proxy queue configured to store results to be placed in the particular result (input) queue, the proxy queue including a head and a tail, and (ii) a proxy queue manager configured to write incoming results to the tail, read outgoing results from the head, and place read results in the particular result (input) queue. The proxy queue manager may be configured to detect duplicate results in the proxy queue, and to remove all but one of the duplicate results from the proxy queue. The proxy queue manager may be configured to detect partially-overlapping results in the proxy queue, and to merge the partially-overlapping results into a smaller number of results. The proxy queue manager may be configured to hold the result in the proxy queue beyond a nominal time at which the result would otherwise be read, and combine the result with one or more other results that arrived to the proxy queue at a later time. The proxy queue manager may be configured to detect that the result exceeds a predetermined size limit, and split the result into two or more results that do not exceed the predetermined size limit.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   one or more server computing devices configured to host a computational instance and disposed within a remote network management platform, wherein the remote network management platform is configured to manage a managed network via the computational instance, wherein the computational instance maintains a plurality of queues and executes a plurality of applications, wherein each of the plurality of applications is configured to communicate with one or more of a plurality of proxy server applications executing within the managed network by way of one or more of the plurality of queues, the communication comprising:
   selecting, by a particular application of the plurality of applications, a particular output queue of the plurality of queues;
   writing, by the particular application, a unit of work generated by the particular application to the particular output queue;
   providing, by the particular output queue, the unit of work to a particular proxy server application of the plurality of proxy server applications;
   retrieving, by a particular input queue of the plurality of queues, a result from the particular proxy server application, wherein the result represents an outcome of the particular proxy server application carrying out the unit of work, and wherein the particular input queue is associated with the particular output queue; and
   retrieving, by the particular application, the result from the particular input queue.

2. The system of claim 1, wherein there is a one-to-one relationship between the plurality of proxy server applications and the plurality of queues, and wherein each queue of the plurality of queues is configured to use a respectively dedicated proxy server application of the plurality of proxy server applications to communicate with the plurality of applications.

3. The system of claim 1, wherein there is a one-to-one relationship between the plurality of applications and the plurality of queues, and wherein each of the plurality of applications uses a respectively dedicated queue of the plurality of queues to communicate with the plurality of proxy server applications.

4. The system of claim 1, wherein each of the plurality of queues is associated with a respective priority, and wherein writing the unit of work generated by the particular application in the particular output queue is based on matching a priority of the unit of work with the respective priority associated with the particular output queue.

5. The system of claim 4, wherein a time at which the particular output queue provides the unit of work to the particular proxy server application is based on the respective priority associated with the particular output queue.

6. The system of claim 1, wherein the particular input queue is configured to retrieve a plurality of results from the particular proxy server application, wherein the plurality of results do not include duplicate results from the particular proxy server application.

7. The system of claim 1, wherein the particular input queue is configured to retrieve a plurality of results from the particular proxy server application, wherein the plurality of retrieved results include merged results of partially-overlapping results into a smaller number of results.

8. The system of claim 1, wherein the particular input queue is configured to retrieve the result from the particular proxy server application, wherein the result is split into two or more results in response to detection of the result exceeding a predetermined size limit, wherein the two or more split results do not exceed the predetermined size limit.

9. A method comprising:
   selecting, by a particular application of a plurality of applications, a particular output queue of a plurality of queues, wherein a computational instance disposed within a remote network management platform maintains the plurality of queues and executes the plurality of applications, wherein each of the plurality of applications is configured to communicate, by way of one or more of the plurality of queues, with one or more of a plurality of proxy server applications executing within a managed network, wherein the remote network management platform manages the managed network via the computational instance;

writing, by the particular application, a unit of work generated by the particular application to a particular output queue of the plurality of queues;

provide, by the particular output queue, the unit of work to a particular proxy server application of the plurality of proxy server applications;

retrieving, by a particular input queue of the plurality of queues, a result from the particular proxy server application, wherein the result represents an outcome of the particular proxy server application carrying out the unit of work, and wherein the particular input queue is associated with the particular output queue; and retrieving, by the particular application, the result from the particular input queue.

10. The method of claim 9, wherein there is a one-to-one relationship between the plurality of proxy server applications and the plurality of queues.

11. The method of claim 10, wherein each queue of the plurality of queues is configured to use a respectively dedicated proxy server application of the plurality of proxy server applications to communicate with the plurality of applications.

12. The method of claim 9, wherein there is a one-to-one relationship between the plurality of applications and the plurality of queues.

13. The method of claim 12, wherein each of the plurality of applications uses a respectively dedicated queue of the plurality of queues to communicate with the plurality of proxy server applications.

14. The method of claim 9, wherein each of the plurality of queues is associated with a respective priority, and wherein writing the unit of work generated by the particular application in the particular output queue is based on matching a priority of the unit of work with the respective priority associated with the particular output queue.

15. The method of claim 14, wherein a time at which the particular output queue provides the unit of work to the particular proxy server application is based on the respective priority associated with the particular output queue.

16. The method of claim 9, wherein the particular input queue is configured to retrieve a plurality of results from the particular proxy server application, wherein the plurality of retrieved results include merged results of partially-overlapping results into a smaller number of results.

17. The method of claim 9, wherein the particular input queue is configured to retrieve the result from the particular proxy server application, wherein the result is split into two or more results in response to detection of the result exceeding a predetermined size limit, wherein the two or more split results do not exceed the predetermined size limit.

18. An article of manufacture comprising a tangible, non-transitory, computer-readable medium, having stored thereon program instructions that, upon execution by a computing system, cause the computing system to perform operations comprising:

selecting, by a particular application of a plurality of applications, a particular output queue of a plurality of queues, wherein a computational instance disposed within a remote network management platform maintains the plurality of queues and executes the plurality of applications, wherein each of the plurality of applications is configured to communicate, by way of one or more of the plurality of queues, with one or more of a plurality of proxy server applications executing within a managed network, wherein the remote network management platform manages the managed network via the computational instance;

writing, by the particular application, a unit of work generated by the particular application to a particular output queue of the plurality of queues, wherein the writing causes the particular output queue to: provide the unit of work to a particular proxy server application of the plurality of proxy server applications, and retrieve a result to a particular input queue of the plurality of queues, wherein the result represents an outcome of the particular proxy server application carrying out the unit of work, and wherein the particular input queue is associated with the particular output queue; and retrieving, by the particular application, the result from the particular input queue.

19. The article of manufacture of claim 18, wherein there is a one-to-one relationship between the plurality of applications and the plurality of queues, and wherein each of the plurality of applications uses a respectively dedicated queue of the plurality of queues to communicate with the plurality of proxy server applications.

20. The article of manufacture of claim 18, wherein each of the plurality of queues is associated with a respective priority, and wherein writing the unit of work generated by the particular application in the particular output queue is based on matching a priority of the unit of work with the respective priority associated with the particular output queue.

* * * * *